United States Patent

Quinn et al.

[11] Patent Number: 5,601,006
[45] Date of Patent: Feb. 11, 1997

[54] PUNCH TOOL WITH INTERCHANGEABLE DIE

[75] Inventors: Charles Quinn, Sun Prairie; Robert T. Schofield, Madison, both of Wis.

[73] Assignee: Fiskars Inc., Madison, Wis.

[21] Appl. No.: 314,876

[22] Filed: Sep. 29, 1994

[51] Int. Cl.$^6$ ............................................. B26F 1/14
[52] U.S. Cl. .......................... 83/588; 83/613; 83/686; 83/698.91
[58] Field of Search ................. 83/588, 167, 698.71, 83/698.91, 686, 684, 690, 613

[56] References Cited

U.S. PATENT DOCUMENTS

| | | |
|---|---|---|
| 99,065 | 1/1870 | Culver . |
| 430,168 | 6/1890 | Brown ................................. 83/588 |
| 918,412 | 4/1909 | Anderson ............................. 83/588 |
| 2,362,039 | 11/1944 | Whistler et al. ................... 83/698.91 |
| 2,373,121 | 4/1945 | Kipp ................................... 83/588 |
| 3,073,199 | 1/1963 | Yerkes . |
| 4,036,088 | 7/1977 | Ruskin ................................ 83/167 |
| 4,594,927 | 6/1986 | Mori . |
| 4,656,907 | 4/1987 | Hymmen ............................. 83/167 |
| 4,713,995 | 12/1987 | Davi ................................... 83/588 |
| 4,742,744 | 5/1988 | Lindberg . |
| 4,757,733 | 7/1988 | Barlow ............................... 83/588 |
| 5,067,242 | 11/1991 | Singer . |
| 5,243,887 | 9/1993 | Bonge, Jr. . |
| 5,247,863 | 9/1993 | Cohen . |

FOREIGN PATENT DOCUMENTS

| | | |
|---|---|---|
| 67016/74 | 9/1975 | Australia . |
| 87221/82 | 7/1986 | Australia . |
| 2646113 | 10/1990 | France . |
| 1552056 | 12/1969 | Germany ............................ 83/698 |

OTHER PUBLICATIONS

Family Treasures Brochure, May 1994, pp. 5–7: This brochure shows a variety of punches that can use interchangeable dies.

*Primary Examiner*—Kenneth E. Peterson
*Attorney, Agent, or Firm*—Foley & Lardner

[57] ABSTRACT

A punch tool for use by children is disclosed. The punch tool includes a removable die and punch assembly that can be inserted and removed from a base portion to permit the punching of holes having a variety of configurations. A cap is rigidly secured to the base and has an indented portion so sheets of paper can be inserted between the base and the cap. The retainer cap includes an opening in which an actuator button is slidably mounted and against which the punch is biased by a spring. Thus, a user can slide a sheet of paper between the base and the retainer cap and punch a hole therethrough by pressing the actuator button with sufficient force to overcome the spring bias.

4 Claims, 4 Drawing Sheets

PUNCH TOOL WITH INTERCHANGEABLE DIE

FIELD OF THE INVENTION

This invention is generally related to punch tools, and particularly to a children's punch tool having an interchangeable die and punch so different shapes or configurations can be punched through sheets of paper.

BACKGROUND OF THE INVENTION

A variety of punch tools are available for punching holes through sheets of material, such as paper. For example, conventional triple punches are used to simultaneously punch three circular holes through sheets of paper so the paper can be clipped into a three ring binder. Those punches are generally large, difficult for a child to carry, and limited in their uses.

Other punch tools are smaller and use a single punch. They typically have a base portion to which a top portion is pivotally attached. The base portion either includes a die area or has a separate die attached thereto. A punch cooperates with the pivotable top and is forced through the die to punch holes through sheets placed over the die. Generally, a spring biases the punch and the pivotable top away from the die and base portion.

These punch tools are problematic for a variety of reasons, including the number and complexity of components. Additionally, most of the punch tools do not provide for interchangeable dies and punches, and those that do are generally constructed in a complex fashion making it difficult for a child to interchange the die and punch. Further, most existing punch tools have a pivotable top portion that pivots towards the base and can be awkward to handle, particularly for a child.

It would be advantageous to have a simple, easy to use punch tool including interchangeable dies and punches.

SUMMARY OF THE INVENTION

The present invention relates generally to a safe, easy to use punch tool particularly for children. The punch tool can be used to punch a variety of holes through sheets, such as paper sheets, and includes a base portion on which the sheets are placed when punched. The punch tool also includes a die and a cutter element disposed to cooperate with the die.

The punch tool also includes a cap securely attached to the base and having an aperture therethrough. A push button or actuator button is configured for movement through the aperture, and the bottom of the push button is shaped for contact with the cutter element to force the cutter element towards the die. A spring is mounted intermediate the base and a portion of the cutter element to bias the cutter element and the push button away from the base. Preferably, the spring acts against the die and the cutter element.

Holes may be punched by placing a sheet on the base and sliding it inwardly until it is beneath the cutter element. Then, application of sufficient pressure against the push button overcomes the spring bias and moves the cutter element into cooperation with the die to punch a hole of predetermined configuration through the sheet.

According to another aspect of the invention, the die and the base each include an attachment region, so the die may be quickly inserted into and removed from the base. The cutter element may be removed with the die. Thus, different die and punch combinations can easily be used with the punch tool to provide punched holes having a variety of configurations.

BRIEF DESCRIPTION OF THE DRAWINGS

The invention will hereafter be described with reference to the accompanying drawings, wherein like reference numerals denote like elements, and.

DESCRIPTION OF THE PREFERRED EMBODIMENT

Figure 1:
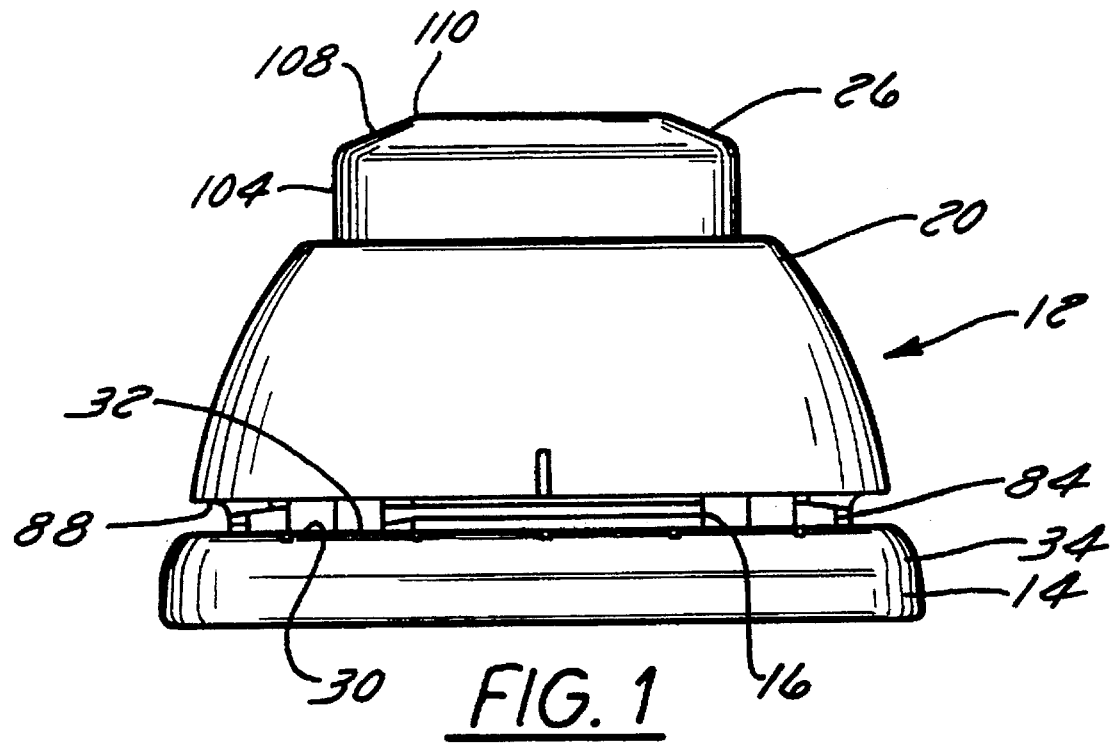
FIG. 1 is a front elevational view of a punch tool according to a preferred embodiment of the invention.
Figure 2:
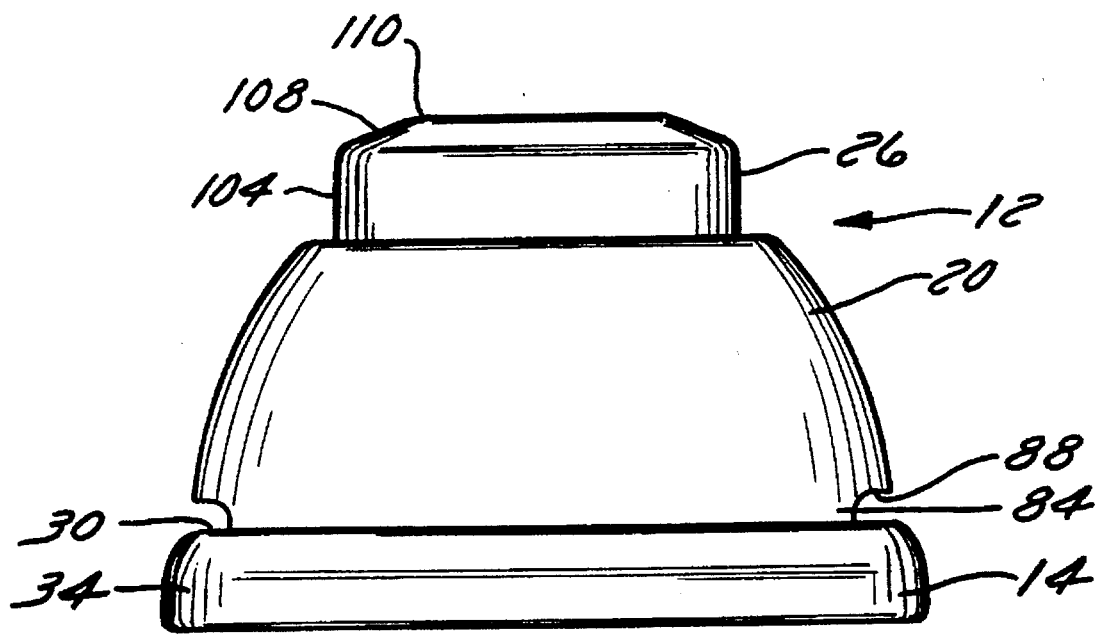
FIG. 2 is a back elevational view of the punch tool shown in FIG. 1.

Referring generally to FIGS. 1–5, a punch tool 12 according to a preferred embodiment of the invention is illustrated. Punch tool 12 includes a base 14 to which a die portion 16 is attached. A cutter element, such as punch 18, is disposed to cooperate with die portion 16 to punch holes through sheets. A cap 20 is attached to base 14, preferably by a fastener, such as a plurality of threaded screws 22.

Cap 20 includes an aperture 24 therethrough that is sized to receive an actuator button 26. Actuator button 26 is appropriately sized for sliding, reciprocating motion within aperture 24. A resilient member, such as spring 28, biases actuator button 26 and punch 18 away from base 14. (See FIG. 6)

Each of the components will now be described in greater detail referring also to FIGS. 6 and 7. Base 14 includes a top wall 30 having a generally flat top surface 32 on which sheets may be laid during the punching operation. A sidewall 34 extends generally downwardly from top wall 30 and forms a hollow bottom region 36. Optionally, a plurality of crossed ribs 38 may be disposed to protrude downwardly from top wall 30.

A plurality of apertures 40 extend through base 14 and are configured to receive screws 22 therethrough. Additionally, base 14 includes an opening 42 and an attachment regions 44 disposed generally along the perimeter of opening 42 to releasably receive die portion 16.

Opening 42 is designed to completely receive die portion 16 when it is inserted upwardly from the bottom of base 14 at an orientation approximately 90° from its working orientation, although the orientation can be changed depending on the configuration of attachment regions 44. In the preferred embodiment, attachment region 44 allows die portion 16 to be rotated approximately 90° after insertion and then holds the die portion in this operating position where it can receive sheets of material.

Attachment regions 44 comprise a plurality of tabs including front lower tabs 46, front upper tab 48, and back tab 50 which cooperate to hold die portion 16 in place once inserted and rotated into base 14. Attachment regions 44 also may include an extension 52 configured to snap into mating engagement with die portion 16 to prevent unwanted rotation thereof. It should be noted that the number and arrangement of the tabs can be changed, and the illustrated embodiment is only one example of many which would adequately hold die portion 16.

Die portion 16 includes a main body 54 having a slot 56 sized to receive the sheets therein. A lower surface 58, defining one side of slot 56, is disposed for general alignment with flat top surface 32 of base 14 when die portion 16 is inserted into base 14. Thus, a sheet of paper may be slid along flat top surface 32 and into slot 56 along lower surface 58 prior to punching. Main body 54 also includes a shearing edge 60 (see FIG. 6) having a predetermined configuration or shape corresponding to the shape to be punched through the sheet of paper. An attachment region 62, including outer lips 64, extends outwardly from main body 54 and is configured to cooperate with attachment region 44. In other words, when die portion 16 is inserted into base 14 and rotated, outer lips 64 rest on back tab 50 and between front lower tab 46 and front upper tab 48 where die portion 16 is held in place by the extension 52 interacting with outer lips 64. Outer lips 64 may have a slightly recessed area designed to snap over extension 52 to aid in preventing accidental rotation of die portion 16 prior to intended exertion of sufficient rotational force. A gripping member 66 extends downwardly from main body 54 and provides an area for a user to grip and rotate die portion 16.

A guide 68 extends upwardly from main body 54 above slot 56 and includes a guide aperture 70 through which punch 18 moves. Aperture 70 helps guide punch 18 across slot 56 and past shearing edge 60 to punch an appropriate hole through a sheet disposed in slot 56 (See FIG. 6). Guide 68 may also be configured to hold spring 28 in place. For instance, if spring 28 is a coil spring, guide 68 may be appropriately sized for insertion into the center of the spring to prevent the spring from sliding laterally with respect to die portion 16 as shown in FIG. 6.

Die portion 16 may also include a pin 72 that extends upwardly from main body 54 and is preferably fitted through an orifice in a tab 73 attached to punch 18. Alignment pin 72 effectively holds die 16, spring 28 and punch 18 together.

Punch 18 is located generally between base 14 and retainer cap 20 and is designed for cutting in cooperation with shearing edge 60 of die portion 16. In the preferred embodiment, punch 18 includes a center portion 74, such as a radially extended platform preferably having a disk-like configuration. Center region 74 has a first side 76 and a second side 78 generally opposite first side 76. A cutting edge or shearing edge 80 extends from first side 76 toward shearing edge 60 of die portion 16. An indicator 82 extends from second side 78 and indicates the shape or configuration of shearing edge 80.

Preferably, spring 28 is a coil spring trapped between center region 74 of punch 18 and base 14. As illustrated, the spring may be disposed to act against first side 76 of center region 74 at one end and main body 54 of die 16 at the other end to generally bias punch 18 away from base 14.

Retainer cap 20 includes an attachment region 84 disposed generally along its back side. Attachment region 84 includes a plurality of openings 86 into which fasteners 22 may be threaded to securely and rigidly attach retainer cap 20 to base 14 along the back portion of base 14. Retainer cap 20 also includes a raised or indented region 88 that permits sheets of paper to be slid between cap 20 and top surface 32 of base 14 and then moved into slot 56 of die portion 16.

Retainer cap 20 further includes aperture 24 for slideably receiving actuator button 26. An upper ridge 92 is disposed at least partially about the perimeter of aperture 24 towards the top of cap 20. Also, a plurality of tabs 94 extend downwardly into the interior of cap 20 and have hooked ends 96 that extend radially inwardly in the interior of cap 20. Ridge 92 and hook ends 96 cooperate to hold actuator button 26 in retainer cap 20 while permitting reciprocable motion of actuator button 26 between ridge 92 and hooked ends 96. Actuator button 26, in turn, includes an outer ridge 98 that may be snapped over hooked ends 96. Button 26 is thus prevented by outer ridge 98 from disconnecting with retainer cap 20 until a user supplies sufficient pressure against actuator button 26 to force ridge 98 past the hooked ends.

Figure 4:
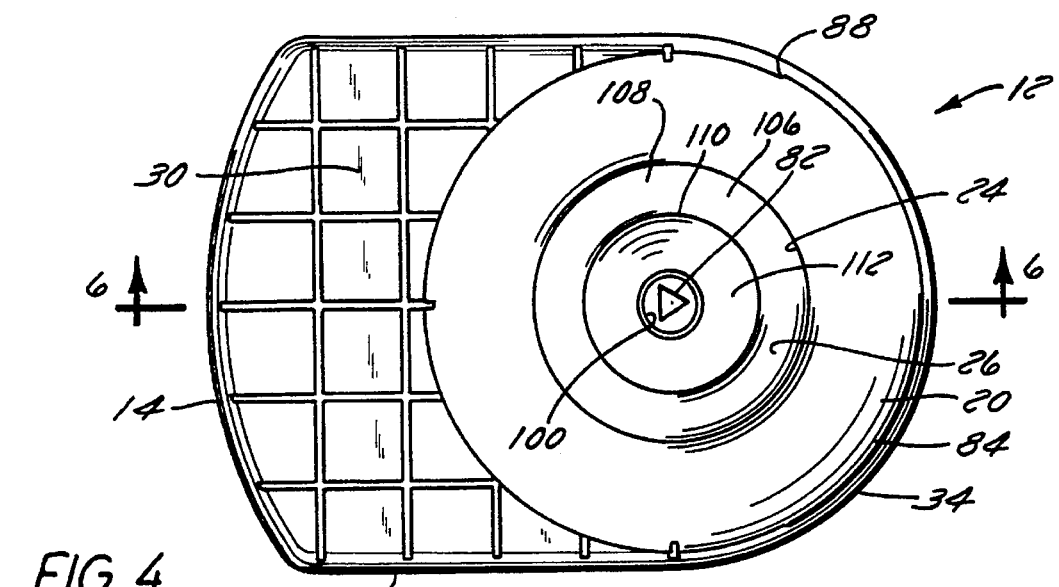
FIG. 4 is a top plan view of the punch tool shown in FIG. 1.
Figure 3:
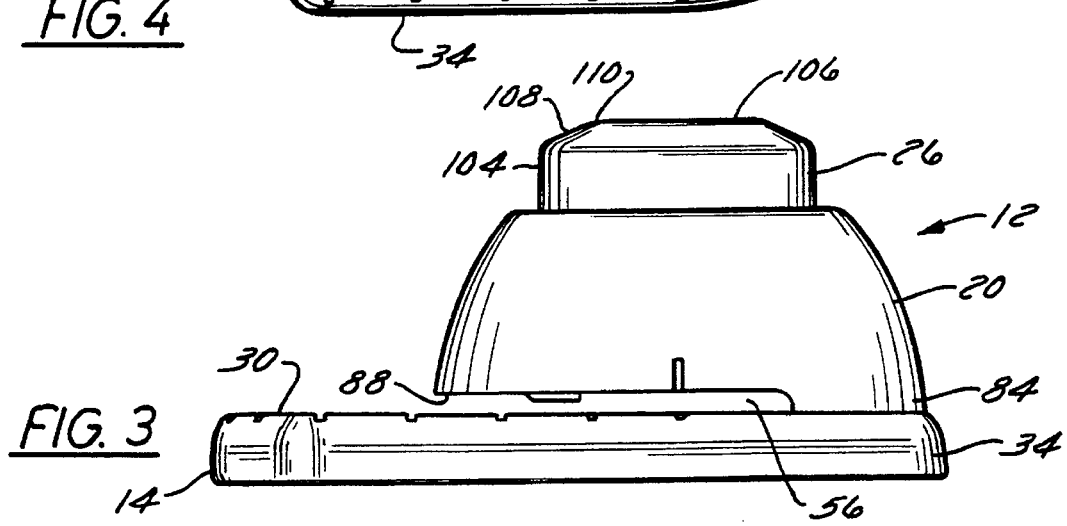
FIG. 3 is a side elevational view of the punch tool shown in FIG. 1.
Figure 5:
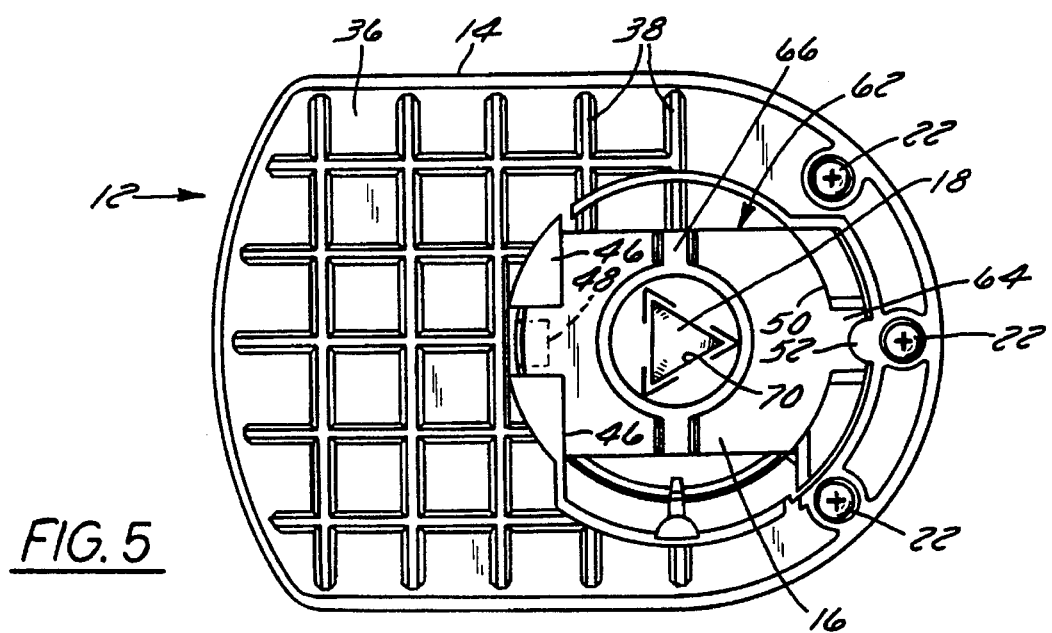
FIG. 5 is a bottom view of the punch tool shown in FIG. 1.
Figure 6:
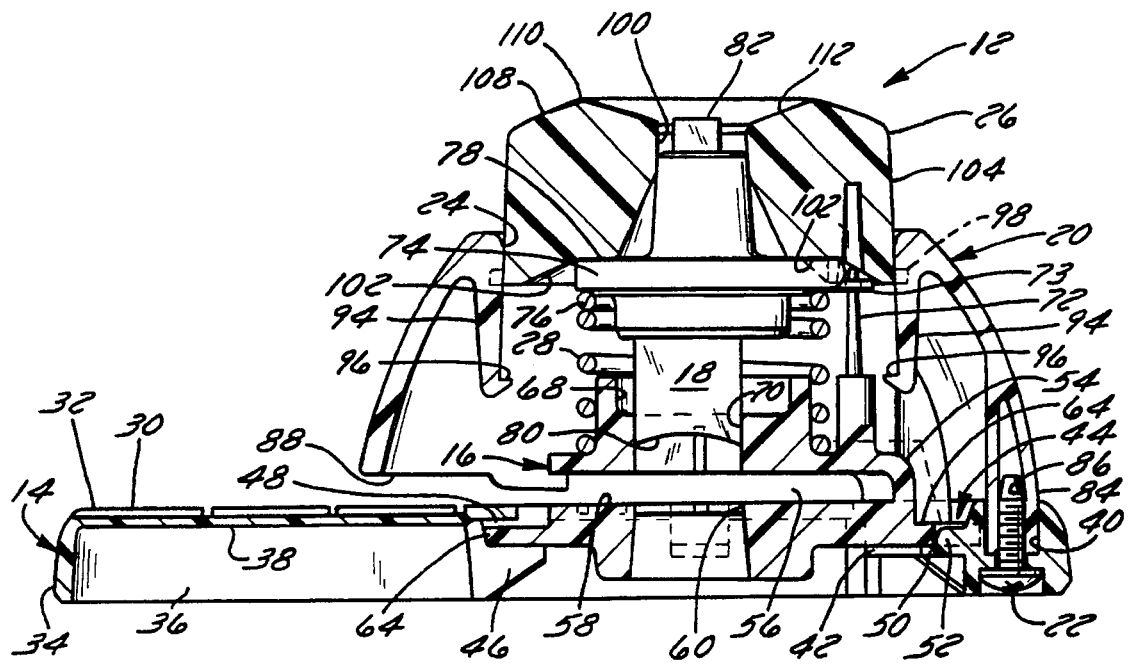
FIG. 6 is a cross-sectional view taken generally along line 6—6 of FIG. 4.
Figure 7:
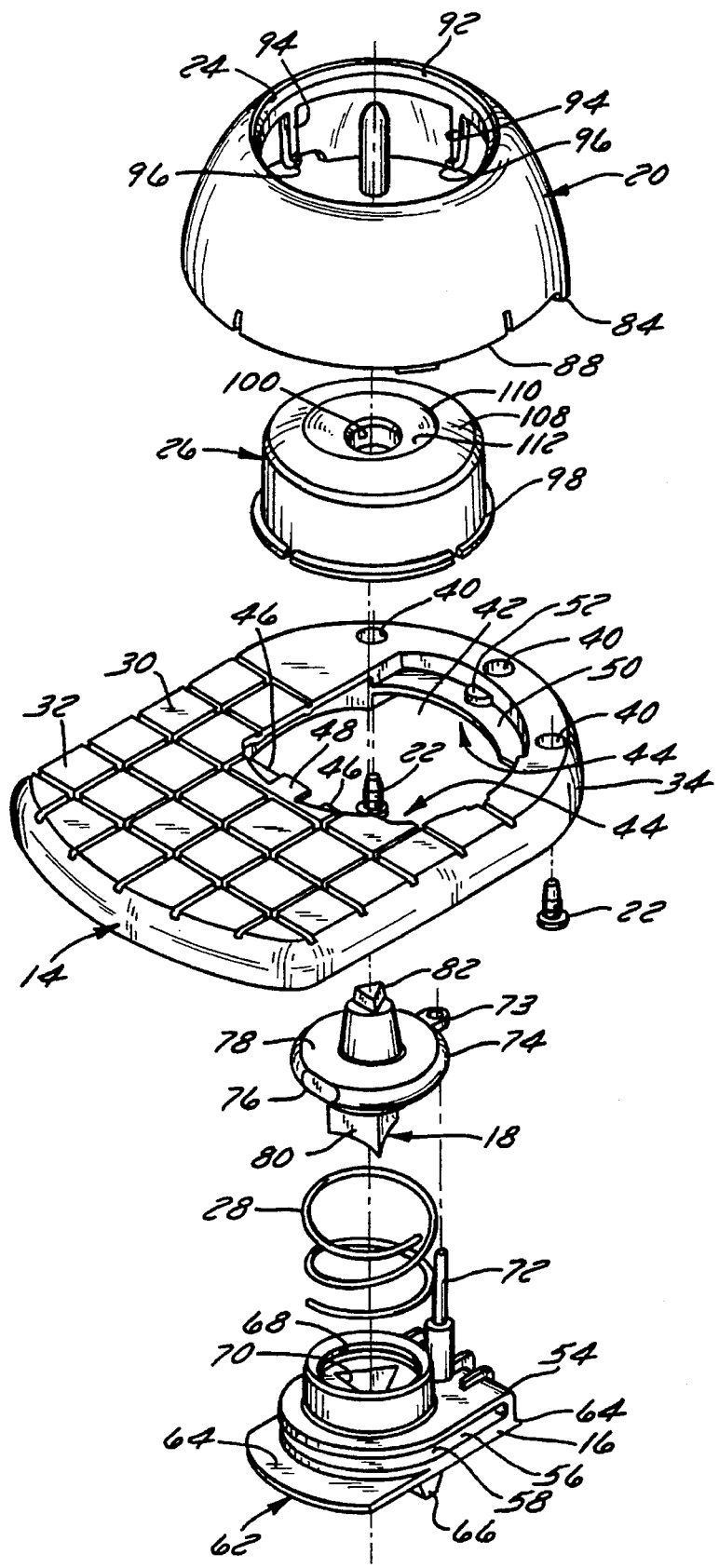
FIG. 7 is an exploded perspective view of the punch tool components.

Additionally, actuator button 26 includes an aperture 100 appropriately sized so indicator 82 of punch 18 can be viewed by a user (see FIGS. 4 and 6). Aperture 100 is also sized to permit second side 78 of punch 18 to abut a bottom surface 102 of actuator button 26. Thus, when die portion 16, punch 18, and spring 28 are assembled into punch tool 12, spring 28 biases punch 18 against bottom surface 102 of actuator button 26. This permits punch tool 12 to be operated simply by placing sufficient pressure against the top of actuator button 26 to overcome the biasing force of spring 28. Then, edge 80 of punch 18 is moved into cooperation with shearing edge 60 of die portion 16.

In the illustrated embodiment, actuator button 26 is generally cylindrical in shape and retainer cap 20 is generally hemispherical in shape. However, these components can be can be made in a variety of other shapes and configurations.

Figure 8:
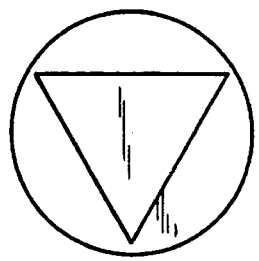
FIG. 8 illustrates a first example of a potential configuration for the die and punch.
Figure 9:
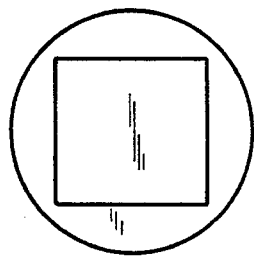
FIG. 9 illustrates a second example of a potential configuration for the die and punch.
Figure 10:
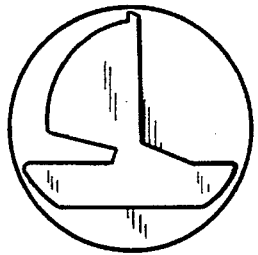
FIG. 10 illustrates a third example of a potential configuration for the die and punch.

Referring also to FIGS. 8–10, a variety of exemplary die and punch configurations are illustrated. The shearing edges of punch 18 and die portion 16 may be made in any of a variety of shapes and configurations, including the triangle of FIG. 8, the square of FIG. 9, and the sailboat of FIG. 10. The design of punch tool 12 allows an individual, such as a child, to quickly and easily insert different die portions and punches and then operate punch tool 12 to create apertures of different shapes easily and efficiently. Die portion 16, punch 18, and spring 28 can be attached to one another to permit changing of the die and punch as a single assembly rather than as individual components.

In operation, the user simply selects a desired shape to be punched and then inserts the appropriate punch 18 into the corresponding die portion 16 with spring 28 disposed therebetween. Or, if die portion 16, punch 18, and spring 28 are connected together as assembly 73, the user simply selects the assembly having the desired shape to be punched. The assembly or the individual components are aligned with base 14, moved upwardly into base 14 and rotated until the attachment region 62 of die portion 16 cooperates with attachment regions 44 of base 14 to hold die portion 16 in its operational position. Thereafter, a sheet of paper is slid over top surface 32 of base 14 and into slot 56 of die portion 16. The user then checks indicator 82 through actuator button 26 to insure the proper cutting configuration. If correct, the user presses downwardly on actuator button 26 to overcome the biasing force of spring 28 and punches a hole of desired configuration through the sheet.

If a hole of a different configuration is desired, the user simply rotates die portion 16 with the assistance of gripping member 66 until die portion 16, spring 28, and punch 18 fall downwardly through opening 42 of base 14. After removal, a second die and punch assembly is inserted into base 14 so holes of this second configuration can be punched.

A variety of materials may be used for the various punch tool components. However, it is preferred that die portion 16 and punch 18 are made of cast zinc, while base 14, cap 20, and button 26 are made of plastic such as polycarbonate.

It will be understood that the foregoing description is of preferred exemplary embodiments of this invention and that the invention is not limited to the specific forms shown. For example, the various punch tool components can be made from a variety of materials. Additionally, the retainer cap can be attached to the base by other fasteners such as adhesive or even by integrally molding the cap with the base. The resilient member can also be made from a variety of materials and in a variety of configurations. Other modifications may be made in the design and arrangement of the elements without departing from the scope of the invention as expressed in the appended claims.

What is claimed is:

1. A punch tool for punching holes through sheets, comprising:
   a base;
   a retainer cap attached to the base;
   a die having a shearing edge of a predetermined shape;
   a punch configured to cooperate with the die, the punch being disposed at least partially between the base and the retainer cap;
   a resilient member disposed to act against the die and a portion of the punch;
   wherein the base includes a first attachment region and the die includes a second attachment region, the first attachment region and the second attachment region each being configured to permit easy attachment and detachment of the base and the die; and
   an actuator button disposed to contact the punch, wherein placing sufficient pressure against the actuator button moves the punch against the biasing force of the resilient member;
   wherein the retainer cap has an aperture through which the actuator button moves;
   wherein the punch includes:
   a center disk portion;
   a cutter edge extending from one side of the disk, the cutter edge being configured to move through the die portion shearing edge to shear sheets; and
   an indicator extending from the other side of the disk to indicate the configuration of the cutter edge; and
   wherein the actuator button includes a hole therethrough for receiving the indicator.

2. The punch tool as recited in claim 1, wherein the resilient member is a coil spring that acts against the center disk portion.

3. A punch tool for punching holes through sheets, comprising:
   a base including an opening and a first attachment region;
   a retainer cap attached to the base;
   a die having a shearing edge of a predetermined shape, and a second attachment region;
   a punch configured to cooperate with the die, the punch being disposed at least partially between the base and the retainer cap;
   a resilient member disposed to act against the die and a portion of the punch;
   the die configured to be inserted at least partially through the opening, wherein the first attachment region and the second attachment region are configured to releasably attach the die and base to one another when the die is inserted at least partially through the opening and rotated; and
   an actuator button disposed to contact the punch, wherein placing sufficient pressure against the actuator button moves the punch against a biasing force of the resilient member;
   wherein the retainer cap has an aperture through which the actuator button moves;
   wherein the punch includes:
   a center disk portion;
   a cutter edge extending from one side of the disk, the cutter edge being configured to move through the die portion shearing edge to shear sheets; and
   an indicator extending from the other side of the disk to indicate the configuration of the cutter edge; and
   wherein the actuator button includes a hole therethrough for receiving the indicator.

4. The punch tool as recited in claim 3, wherein the resilient member is a coil spring that acts against the center disk portion.

* * * * *